(12) United States Patent
Zhang

(10) Patent No.: US 10,833,797 B2
(45) Date of Patent: Nov. 10, 2020

(54) METHOD AND DEVICE IN UE AND BASE STATION FOR TRANSMITTING POWER ADJUSTMENT

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/361,184

(22) Filed: Mar. 21, 2019

(65) Prior Publication Data

US 2019/0222348 A1 Jul. 18, 2019

Related U.S. Application Data

(63) Continuation of application No. PCT/CN2017/093858, filed on Jul. 21, 2017.

(30) Foreign Application Priority Data

Sep. 24, 2016 (CN) .......................... 2016 1 0848979

(51) Int. Cl.
*H04W 72/04* (2009.01)
*H04L 1/00* (2006.01)
(Continued)

(52) U.S. Cl.
CPC ........ *H04L 1/0004* (2013.01); *H04L 27/2602* (2013.01); *H04L 27/2607* (2013.01);
(Continued)

(58) Field of Classification Search
CPC . H04L 1/0004; H04L 1/0025; H04L 27/2602; H04L 27/2607; H04L 27/2614;
(Continued)

(56) References Cited

U.S. PATENT DOCUMENTS

| | | | |
|---|---|---|---|
| 2012/0327866 A1* | 12/2012 | Krishnamurthy ... | H04W 52/146 370/329 |
| 2014/0301234 A1* | 10/2014 | Nogami ................ | H04L 5/0053 370/252 |

(Continued)

FOREIGN PATENT DOCUMENTS

| | | |
|---|---|---|
| CN | 1985451 A | 6/2007 |
| CN | 101981984 A | 2/2011 |

(Continued)

OTHER PUBLICATIONS

CN201610848979.7 1st Office Action dated Jan. 3, 2019.
(Continued)

*Primary Examiner* — Curtis A Alia
(74) *Attorney, Agent, or Firm* — Maschoff Brennan

(57) ABSTRACT

The present disclosure provides a method and a User Equipment (UE) supporting transmission power adjustment. The UE first receives a first signaling, and then transmits a first wireless signal. A first modulation symbol sequence is used to generate the first wireless signal; the first modulation symbol sequence employs a target waveform; a first bit block is used to generate the first modulation symbol sequence; the first signaling is used to determine the target waveform out of X waveforms; a transmitting power of the first wireless signal is a first power; at least one of an upper bound of the first power and the first power is related to the target waveform. The method can adjust the UE transmitting power according to the waveform of the uplink transmis- (Continued)

sion, thus reducing the power loss of the UE or improving the coverage performance of the uplink transmission.

20 Claims, 10 Drawing Sheets

(51) Int. Cl.
*H04L 27/26* (2006.01)
*H04W 52/34* (2009.01)
*H04W 52/26* (2009.01)
*H04W 52/02* (2009.01)
*H04W 52/36* (2009.01)
*H04W 52/14* (2009.01)
*H04L 5/00* (2006.01)

(52) U.S. Cl.
CPC ... *H04W 52/0222* (2013.01); *H04W 52/0235* (2013.01); *H04W 52/146* (2013.01); *H04W 52/26* (2013.01); *H04W 52/34* (2013.01); *H04W 52/346* (2013.01); *H04W 52/367* (2013.01); *H04W 72/0473* (2013.01); *H04L 5/0007* (2013.01); *H04L 27/2614* (2013.01); *H04W 52/262* (2013.01); *H04W 52/265* (2013.01); *Y02D 30/70* (2020.08)

(58) Field of Classification Search
CPC .............. H04L 5/0007; H04W 52/346; H04W 52/146; H04W 52/0235; H04W 52/367; H04W 52/0222; H04W 52/26; H04W 52/34; H04W 52/262; H04W 52/265; H04W 52/241; H04W 52/14; H04W 52/18; H04W 72/0473; Y02D 70/00
See application file for complete search history.

(56) References Cited

U.S. PATENT DOCUMENTS

| | | | | |
|---|---|---|---|---|
| 2015/0071203 | A1* | 3/2015 | Lee | H04L 5/0044 370/329 |
| 2016/0353476 | A1* | 12/2016 | Sartori | H04L 5/0007 |

FOREIGN PATENT DOCUMENTS

| | | |
|---|---|---|
| CN | 102150387 A | 8/2011 |
| CN | 102255620 A | 11/2011 |
| CN | 104770040 A | 7/2015 |
| WO | 2015143991 A1 | 10/2015 |

OTHER PUBLICATIONS

CN201610848979.7 1st Search Report dated Dec. 22, 2018.
ISR received in application No. PCT/CN2017/093858 dated Oct. 18, 2017.

* cited by examiner

METHOD AND DEVICE IN UE AND BASE STATION FOR TRANSMITTING POWER ADJUSTMENT

CROSS REFERENCE TO RELATED APPLICATION

This application is a continuation of International Application No. PCT/CN2017/093858, filed Jul. 21, 2017, claiming the priority benefit of Chinese Patent Application Ser. No. 201610848979.7, filed on Sep. 24, 2016, the full disclosure of which is incorporated herein by reference.

BACKGROUND

Technical Field

The present disclosure relates to transmission schemes in wireless communication systems, and in particular to methods and devices for transmitting power adjustment.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary meeting decided to conduct the study of New Radio (NR).

In order to adapt to diversified application scenarios and meet different requirements, wireless communication systems, particularly NR, will be able to support multiple numerologies. Multiple numerologies correspond to various subcarrier spacings, various time lengths of symbol, or various Cyclic Prefix (CP) lengths, etc. At the same time, in order to improve system performance, especially the throughput and capacity of the system, NR will support more flexible resource allocation, therefore at 3GPP RAN1#86 plenary meeting it was decided to include Cyclic Prefix-Orthogonal Frequency Division Multiplexing (CP-OFDM) and low Peak to Average Power to Ratio (PAPR) or Cubic Metric (CM) waveform(s) as supported uplink waveforms. PAPR or CM of an uplink waveform has direct impact on coverage performance and power consumption of uplink transmissions utilizing the uplink waveform, and an uplink waveform will affect the target Signal to Interference plus Noise Ratio (SINR) while decoding the signal at the receiver side. At 3GPP RAN1#86 plenary meeting, it was approved that CP-OFDM waveform and a low PAPR/CM waveform are complementary.

SUMMARY

In existing wireless communication systems (such as LTE), due to restrictions of transmitter hardware and requirements of controlling out-of-band emission, a maximum transmitting power of uplink transmission is subject to strict limitations. In existing specifications, a maximum transmitting power of uplink transmission and its actual transmitting power shall take into account the impacts of the transmission bandwidth, the modulation scheme, and the frequency band where the signal is carried on uplink PAPR/CM and the requirements of out-of-band emission, so as to reach a tradeoff between power consumption and coverage by adjusting the transmitting power, thus improving the system performance. In NR system, the introduction of multiple uplink waveforms (CP-OFDM and other waveform(s) capable of reducing PAPR/CM) leads to large distinctions between different waveforms in terms of PAPR/CM performance and the target SINR of receiver in uplink transmission. If the existing uplink power control mechanism is reused, the power consumption may be increased and the coverage may be decreased or even the optimized tradeoff between the power consumption and the coverage may be broken, leading to degraded system performance.

In view of the problem of uplink power control arising from the adoption of different waveforms for the system, the present disclosure provides a solution. Considering impacts of different waveforms when configuring an upper bound of uplink transmission power and controlling the actual uplink transmission power, the solution of the disclosure can improve the coverage performance and optimize the power consumption of uplink transmissions. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a User Equipment (UE) for supporting power adjustment, comprising:

receiving a first signaling; and transmitting a first wireless signal;

wherein, a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at last one of {an upper bound of the first power, the first power} is related to the target waveform.

In one embodiment, the target waveform impacts PAPR or CM of the first wireless signal, which in turn has influence on the coverage performance of the first wireless signal; in the meantime, the target waveform also impacts the target SINR of a receiver of the first wireless signal; therefore optimal design of the UE power consumption and coverage performance can be realized by associating at least one of {an upper bound of the first power, the first power} with the target waveform.

In one embodiment, the target waveform is based on OFDM, namely, the target waveform is generated through Inverse Discrete Fourier Transform (IDFI) or Inverse Fast Fourier Transform (IFFT) for the baseband.

In one embodiment, the target waveform is generated based on transform precoding and OFDM.

In one embodiment, the target waveform is Cyclic Prefix-Orthogonal Frequency Division Multiplexing (CP-OFDM).

In one embodiment, the target waveform is Discrete Fourier Transform-Spread-Orthogonal Frequency Division Multiplexing (DFT-S-OFDM).

In one embodiment, the target waveform is Single Carrier-Frequency Division Multiple Access (SC-FDMA).

In one embodiment, the target waveform is Circularly Pulse Shaped-Orthogonal Frequency Division Multiplexing (CPS-OFDM).

In one embodiment, the target waveform is Filter Bank-Orthogonal Frequency Division Multiplexing (FB-OFDM).

In one embodiment, the target waveform is one of {Cyclic Prefix Less Precoded OFDM (CPLP-OFDM), Flexibly Configured OFDM (FC-OFDM), Flexible CP-OFDM (FCP-OFDM), Flexi-OFDM, Unique Word Discrete Fourier Transform spread Orthogonal Frequency Division Multiplexing (UW DFT-S-OFDM), Orthogonal Time Frequency Space (OTFS), Windowed OFDM (W-OFDM), and Filtered OFDM (F-OFDM)}.

In one embodiment, the target waveform is generated by windowing on the basis of OFDM.

In one embodiment, the target waveform is generated by filtering on the basis of OFDM.

In one embodiment, the X waveforms are X of {CP-OFDM, DFT-S-OFDM, CPS-OFDM, FB-OFDM, CPLP-OFDM, FC-OFDM, FCP-OFDM, Flexi-OFDM, UW DFT-S-OFDM, OTFS, W-OFDM, F-OFDM}.

In one embodiment, the first bit block comprises a positive integer of bits.

In one embodiment, the first bit block comprises an output of a code block going through channel encoding. In one subembodiment, the code block is a Transport Block (TB). In one subembodiment, the code block is a part of a TB.

In one embodiment, the first wireless signal is obtained after the first bit block sequentially goes through modulation mapper, layer mapper, precoding, resource element mapper and OFDM signal generation.

In one embodiment, the first modulation symbol sequence is generated by modulating the first bit block, wherein the modulating is one of {Binary Phase Shift Keying (BPSK), π/2 BPSK, Quadrature Phase Shift Keying (QPSK), π/4 QPSK, 16 Quadrature Amplitude Modulation (16 QAM), 64 QAM, 256 QAM, 1024 QAM and 20156 QAM}.

In one embodiment, the first wireless signal is obtained after the first modulation symbol sequence sequentially goes through layer mapper, precoding, resource element mapper and OFDM signal generation.

In one embodiment, the first signaling is a higher-layer signaling.

In one embodiment, the first signaling is Radio Resource Control (RRC).

In one embodiment, the first signaling is a physical layer signaling.

In one embodiment, the first signaling is a physical layer signaling; the first signaling comprises scheduling information of the first wireless signal; the scheduling information comprises at least one of {time-frequency resources occupied, MCS, RV, NDI, HARQ Process Identity Number (PID)}.

In one embodiment, the first signaling explicitly indicates the target waveform.

In one embodiment, the first signaling comprises default configuration of the target waveform.

In one embodiment, the first signaling implicitly indicates the target waveform.

In one embodiment, the first wireless signal is transmitted within a carrier; the carrier where the first wireless signal is transmitted is a serving carrier.

In one subembodiment, the first power is a power of the UE when the first wireless signal is transmitted within the serving carrier.

In one embodiment, the first power is a normalized transmitting power of the first wireless signal; the normalization refers to an average of the energies of all constellation points pertaining to one modulation scheme.

In one embodiment, a range of the upper bound of the first power is related to at least the target waveform, the upper bound of the first power is set by the UE itself within the range of the upper bound of the first power.

According to one aspect of the present disclosure, the method in a User Equipment (UE) for supporting power adjustment further comprises:

receiving a second signaling;

wherein the second signaling is used to determine a first parameter; the first parameter is used to determine a lower bound of the upper bound of the first power; the first parameter is related to the target waveform.

In one embodiment, through the introduction of the second signaling, the network can flexibly control a maximum transmitting power of the UE based on the transmitting environment so as to realize flexible configuration of the power consumption and optimal design.

In one embodiment, the first parameter is Maximum Power Reduction (MPR).

In one embodiment, the first parameter is Additional Maximum Power Reduction (A-MPR).

In one embodiment, the first parameter is Power Management Maximum Power Reduction (P-MPR).

In one embodiment, the first power is less than the lower bound of the upper bound of the first power.

In one embodiment, the first power is greater than the lower bound of the upper bound of the first power.

In one embodiment, the first power is equal to the lower bound of the upper bound of the first power.

In one embodiment, the lower bound of the upper bound of the first power is determined by the following formula:

$$P_{CMAX\_L,c} = MIN\{P_{A,c}, P_{PowerClass} - MAX(X\text{-}MPR_c, P\text{-}MPR_c)\}$$

wherein, carrier c denotes a serving carrier of the first wireless signal;

$P_{CMAX\_L,c}$ denotes the lower bound of the upper bound of the first power, and the unit is dBm;

$P_{A,c}$ denotes a third parameter, the third parameter is configured by the network, and the unit is dBm;

$P_{PowerClass}$ denotes a transmitting power corresponding to a power class of the UE, and the unit is dBm;

X-MPR$_c$ denotes the first parameter, and the unit is dB;

P-MPR$_c$ denotes P-MPR value, and the unit is dB.

In one subembodiment, the method in a User Equipment (UE) for supporting power adjustment further comprises:

receiving a fourth signaling;

wherein the fourth signaling is used to determine the third parameter.

In one embodiment, the first parameter is linearly correlated with the lower bound of the upper bound of the first power within a given range.

In one embodiment, the first parameter is determined by at least the target waveform.

In one embodiment, the second signaling is a higher-layer signaling.

In one embodiment, the second signaling is Radio Resource Control (RRC).

In one embodiment, the second signaling is a physical layer signaling.

In one embodiment, the second signaling is a physical layer signaling; the second signaling comprises scheduling information of the first wireless signal; the scheduling information comprises at least one of {time-frequency resources occupied, MCS, RV, NDI, HARQ Process Identity Number (PID)}.

In one embodiment, the second signaling explicitly indicates the first parameter.

In one embodiment, the second signaling comprises a default value of the first parameter.

In one embodiment, the second signaling implicitly indicates the first parameter.

According to one aspect of the present disclosure, in the method in a User Equipment (UE) for supporting power adjustment, the first parameter is also related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one embodiment, a transmitting power corresponding to the power class of the UE is a nominal transmitting power of the UE.

In one embodiment, a transmitting power corresponding to the power class of the UE does not comprise a fluctuation range of tolerance.

In one embodiment, the carrier where the first wireless signal is carried refers to a frequency band allocated for the system the first wireless signal belonging to.

In one embodiment, the frequency of the carrier frequency where the first wireless signal is carried refers to Absolute Radio Frequency Channel Number (ARFCN).

In one embodiment, the type of the receiver of the first wireless signal is one of {base station device, user equipment, relay equipment}.

In one embodiment, the subcarrier spacings of the subcarriers occupied by the first wireless signal are equal.

In one embodiment, there exist two subcarriers with unequal subcarrier spacings out of subcarriers occupied by the first wireless signal.

In one embodiment, the subcarrier spacing of the subcarrier occupied by the first wireless signal is 3.75 kHz times the $K^{th}$ power of 2; the K is an integer greater than or equal to 0._boss In one embodiment, the amount of the subcarriers occupied by the first wireless signal is a positive integer.

In one embodiment, the amount of the subcarriers occupied by the first wireless signal is the multiple of 12.

In one embodiment, the position of the subcarriers occupied by the first wireless signal in frequency domain is within the edge Y MHz of the system bandwidth of the access system the first wireless signal pertaining to. In one subembodiment, the Y is equal to 4.

In one embodiment, the position of the subcarriers occupied by the first wireless signal in frequency domain is outside the edge Y MHz of the system bandwidth of the access system the first wireless signal pertaining to. In one subembodiment, the Y is equal to 4.

In one embodiment, the modulation scheme of the first modulation symbol sequence is one of {Binary Phase Shift Keying (BPSK), π/2 BPSK, Quadrature Phase Shift Keying (QPSK), π/4 QPSK, 16 Quadrature Amplitude Modulation (16 QAM), 64 QAM, 256 QAM, 1024 QAM and 20156 QAM}.

According to one aspect of the present disclosure, the above method is characterized in that the X is equal to 2; the X waveforms are OFDM and SC-FDMA respectively.

According to one aspect of the present disclosure, the method in a User Equipment (UE) for supporting power adjustment further comprises:
receiving a third signaling;
wherein, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence}.

In one embodiment, the third signaling is a higher-layer signaling.

In one embodiment, the third signaling is RRC.

In one embodiment, the third signaling is a physical layer signaling.

In one embodiment, the third signaling is a physical layer signaling; the third signaling comprises scheduling information of the first wireless signal; the scheduling information comprises at least one of {time-frequency resources occupied, MCS, RV, NDI, HARQ Process Identity Number (PID)}.

In one embodiment, the third signaling explicitly indicates at least one of {an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence}.

In one embodiment, the third signaling implicitly indicates at least one of {an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence}.

According to one aspect of the present disclosure, in the method in a User Equipment (UE) for supporting power adjustment, the first power is equal to the smaller one of {a second power, the upper bound of the first power}, the second power is related to the target waveform.

In one embodiment, the second power is greater than the upper bound of the first power.

In one embodiment, the second power is less than the upper bound of the first power.

In one embodiment, the second power is equal to the upper bound of the first power.

In one embodiment, the second power is also related to at least one of {a pathloss of the UE, a target power of the UE, a type of carriers occupied by the first wireless signal, an amount of subcarriers occupied by the first wireless signal, a subcarrier spacing of a subcarrier occupied by the first wireless signal, a modulation scheme of the first modulation symbol sequence}.

In one embodiment, the second power is a normalized transmitting power; the normalization refers to an average of the energies of all constellation points pertaining to one modulation scheme.

In one embodiment, the second power comprises the part controlled by open-loop power control and the part controlled by closed-loop power control.

According to one aspect of the present disclosure, the above method is characterized in that the target waveform is used to determine a second parameter; the second parameter is linearly correlated with the second power.

In one embodiment, the second parameter is linearly positively correlated with the second power.

In one embodiment, the second parameter is linearly negatively correlated with the second power.

In one embodiment, the second power is described in the form of logarithm; the second parameter is dB. In one subembodiment, the unit of the second power is dBm.

In one embodiment, the second power is computed by the following formula:

$$P_s = P_1 + \Delta_w$$

wherein, $P_s$ represents the second power; $\Delta_w$ represents the second parameter, $P_1$ represents a power value decided by factors other than the target waveform; the factors other than the target waveform include but are not limited to a path loss of the UE; a target power value of the first wireless signal; frequency band width of the first wireless signal; a configured power stepsize; a modulation scheme of the first wireless signal.

In one embodiment, the second power is computed by the following formula:

$$P_s = P_1 - \Delta_w$$

wherein, $P_s$ represents the second power; $\Delta_w$ represents the second parameter; $P_1$ represents a power value decided by factors other than the target waveform; the factors other than the target waveform include but are not limited to a path loss of the UE; a target power value of the first wireless signal, frequency band width of the first wireless signal; a configured power stepsize; a modulation scheme of the first wireless signal.

The present disclosure provides a method in a base station for supporting power adjustment, comprising:

transmitting a first signaling; and receiving a first wireless signal;

wherein, a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at least one of {an upper bound of the first power, the first power} is related to the target waveform.

According to one aspect of the present disclosure, the method in a base station for supporting power adjustment further comprises:

transmitting a second signaling;

wherein, the second signaling is used to determine a first parameter; the first parameter is used to determine a lower bound of the upper bound of the first power; the first parameter is related to the target waveform.

According to one aspect of the present disclosure, in the method in a base station for supporting power adjustment, the first parameter is also related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

According to one aspect of the present disclosure, in the method in a base station for supporting power adjustment, the X is equal to 2, the X waveforms are OFDM and SC-FDMA respectively.

According to one aspect of the present disclosure, the method in a base station for supporting power adjustment further comprises:

transmitting a third signaling;

wherein, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence}.

According to one aspect of the present disclosure, in the method in a base station for supporting power adjustment, the first power is equal to the smaller one of {a second power, the upper bound of the first power}, and the second power is related to the target waveform.

According to one aspect of the present disclosure, in the method in a base station for supporting power adjustment, the target waveform is used to determine a second parameter; the second parameter is linearly correlated with the second power.

The present disclosure provides a user equipment supporting power adjustment, comprising:

a first receiver, receiving a first signaling; and a second transmitter, transmitting a first wireless signal;

wherein, a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at least one of {an upper bound of the first power, the first power} is related to the target waveform.

According to one aspect of the present disclosure, in the UE, the first receiver further receives a second signaling; the second signaling is used to determine a first parameter; the first parameter is used to determine a lower bound of the upper bound of the first power; the first parameter is related to the target waveform.

According to one aspect of the present disclosure, in the UE, the first parameter is also related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

According to one aspect of the present disclosure, in the UE, the X is equal to 2; the X waveforms are OFDM and SC-FDMA respectively.

According to one aspect of the present disclosure, in the UE, the first receiver further receives a third signaling, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

According to one aspect of the present disclosure, in the UE, the first power is equal to the smaller one of {a second power, the upper bound of the first power}, the second power is related to the target waveform.

According to one aspect of the present disclosure, in the UE, the target waveform is used to determine a second parameter; the second parameter is linearly correlated with the second power.

The present disclosure provides a base station supporting power adjustment, comprising:

a third transmitter, transmitting a first signaling; and a fourth receiver, receiving a first wireless signal;

wherein, a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at least one of {an upper bound of the first power, the first power} is related to the target waveform.

According to one aspect of the present disclosure, the above base station is characterized in that the third transmitter further transmits a second signaling; the second signaling is used to determine a first parameter; the first parameter is used to determine a lower bound of the upper bound of the first power; the first parameter is related to the target waveform.

According to one aspect of the present disclosure, in the base station, the first parameter is also related to at least one of {a power class of the UE, a frequency of a carrier frequency where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

According to one aspect of the present disclosure, in the base station, the X is equal to 2; the X waveforms are OFDM and SC-FDMA respectively.

According to one aspect of the present disclosure, in the base station, the third transmitter further transmits a third signaling, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

According to one aspect of the present disclosure, in the base station, the first power is equal to the smaller one of {a second power, the upper bound of the first power}, the second power is related to the target waveform.

According to one aspect of the present disclosure, in the base station, the target waveform is used to determine a second parameter; the second parameter is linearly correlated with the second power.

In one embodiment, the present disclosure has the following technical advantages over the existing techniques:

The present disclosure manages to configure upper bounds of transmitting power of uplink transmissions in accordance with different uplink waveforms and corresponding PAPR/CM, thus making it possible to improve the coverage performance of transmission based on various uplink waveforms.

Considering the impacts of uplink waveform on the target SINR of receivers, compensation of uplink power for different uplink waveforms is made through uplink power control, ensuring an improvement in uplink power control performance.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
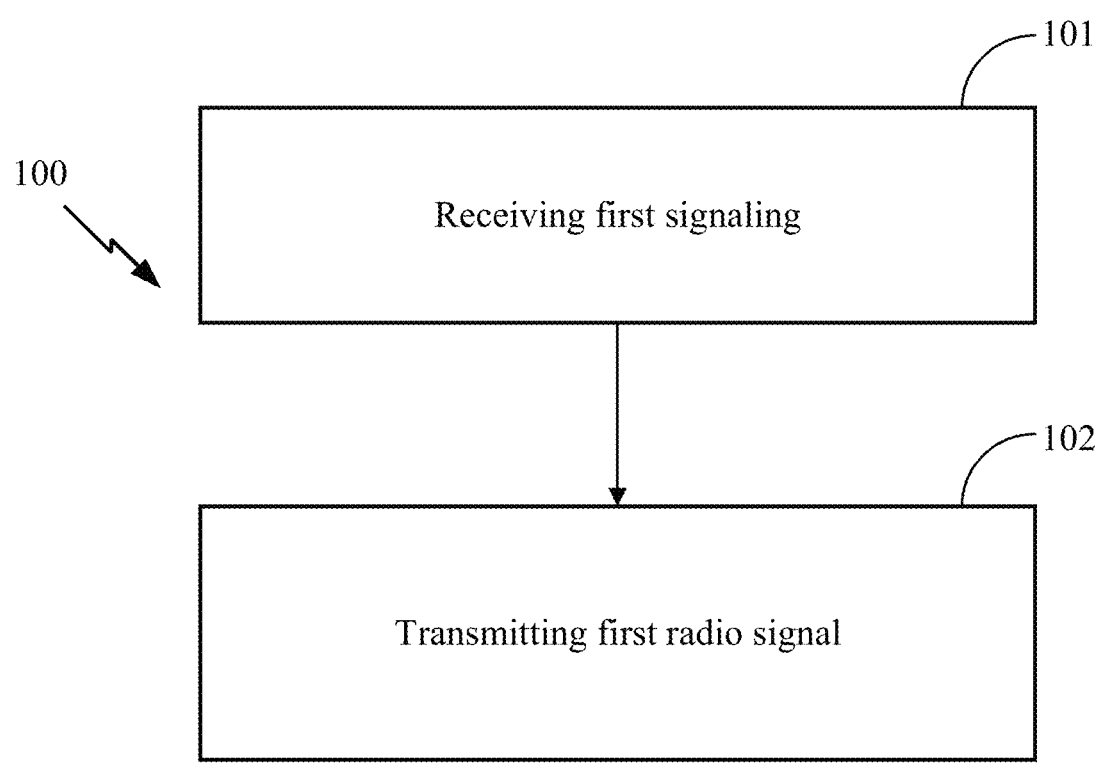
FIG. 1 illustrates a flow chart of transmission of a first signaling and a first wireless signal according to one embodiment of the present disclosure.

Embodiment 1 illustrates an example a flow chart of transmission of a first signaling and a first wireless signal, as shown in FIG. 1. In FIG. 1, each box represents a step. In Embodiment 1, a user equipment of the present disclosure first receives a first signaling, and then transmits a first wireless signal; wherein a first modulation symbol sequence is used to generate the first wireless signal; the first modulation symbol employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at least one of {an upper bound of the first power, the first power} is related to the target waveform.

In one subembodiment, the target waveform impacts PAPR or CM of the first wireless signal, which in turn has some influence on the coverage performance of the first wireless signal; in the meantime, the target waveform also impacts the target SINR of the receiver of the first wireless signal; therefore optimal design of the UE power consumption and coverage can be realized by associating at least one of {an upper bound of the first power, the first power} with the target waveform.

In one subembodiment, the target waveform is based on OFDM, namely, the target waveform is generated by Inverse Discrete Fourier Transform (IDFI) and Inverse Fast Fourier Transform (IFFT) for the baseband.

In one subembodiment, the target waveform is generated by Transform Precoding and OFDM.

In one subembodiment, the target waveform is Cyclic Prefix-Orthogonal Frequency Division Multiplexing (CP-OFDM).

In one subembodiment, the target waveform is Discrete Fourier Transform-Spread-Orthogonal Frequency Division Multiplexing (DFT-S-OFDM).

In one subembodiment, the target waveform is Single Carrier-Frequency Division Multiple Access (SC-FDMA).

In one subembodiment, the target waveform is Circularly Pulse Shaped-Orthogonal Frequency Division Multiplexing (CPS-OFDM).

In one subembodiment, the target waveform is Filter Bank-Orthogonal Frequency Division Multiplexing (FB-OFDM).

In one subembodiment, the target waveform is one of {Cyclic Prefix Less Precoded OFDM (CPLP-OFDM), Flexibly Configured OFDM (FC-OFDM), Flexible CP-OFDM (FCP-OFDM), Unique Word Discrete Fourier Transform spread Orthogonal Frequency Division Multiplexing (UW DFT-S-OFDM), Orthogonal Time Frequency Space (OTFS), Windowed OFDM (W-OFDM), Filtered OFDM (F-OFDM)}.

In one subembodiment, the target waveform is generated by windowing on the basis of OFDM.

In one subembodiment, the target waveform is generated by filtering on the basis of OFDM.

In one subembodiment, the X waveforms are X of {CP-OFDM, DFT-S-OFDM, CPS-OFDM, FB-OFDM, CPLP-OFDM, FC-OFDM, FCP-OFDM, Flexi-OFDM, UW DFT-S-OFDM, OTFS, W-OFDM, F-OFDM}.

In one subembodiment, the first bit block comprises a positive integer of bits.

In one subembodiment, the first bit block comprises an output of a code block going through channel encoding.

In one affiliated embodiment of the above subembodiment, the code block is a Transport Block (TB). In one subembodiment, the code block is a part of a TB.

In one subembodiment, the first wireless signal is obtained after the first bit block sequentially goes through modulation mapper, layer mapper, precoding, resource element mapper and OFDM signal generation.

In one subembodiment, the first modulation symbol sequence is generated by modulating the first bit block, wherein the modulating is one of {Binary Phase Shift Keying (BPSK), π/2 BPSK, Quadrature Phase Shift Keying (QPSK), π/4 QPSK, 16 Quadrature Amplitude Modulation (16 QAM), 64 QAM, 256 QAM, 1024 QAM and 20156 QAM}.

In one subembodiment, the first wireless signal is obtained after the first modulation symbol sequence sequentially goes through layer mapper, precoding, resource element mapper and OFDM signal generation.

In one subembodiment, the first signaling is a higher-layer signaling.

In one subembodiment, the first signaling is Radio Resource Control (RRC).

In one subembodiment, the first signaling is a physical layer signaling.

In one subembodiment, the first signaling is a physical layer signaling, the first signaling comprises scheduling information of the first wireless signal, the scheduling information comprises at least one of {time-frequency resources occupied, MCS, RV, NDI, HARQ Process Identity Number (PID)}.

In one subembodiment, the first signaling explicitly indicates the target waveform.

In one subembodiment, the first signaling comprises default configuration of the target waveform.

In one subembodiment, the first signaling implicitly indicates the target waveform.

In one subembodiment, the first wireless signal is transmitted on a carrier, the carrier which transmits the first wireless signal is a serving carrier.

In one affiliated embodiment of the above subembodiment, the first power is a power of the UE when transmitting the first wireless signal on the serving carrier.

In one subembodiment, the first power is a normalized transmitting power of the first wireless signal, the normalization refers to an average of energies of all constellation points pertaining to one modulation scheme.

In one subembodiment, a range of the upper bound of the first power is related to at least the target waveform, the upper bound of the first power is set by the UE itself within the range of the upper bound of the first power.

Embodiment 2

Figure 2:
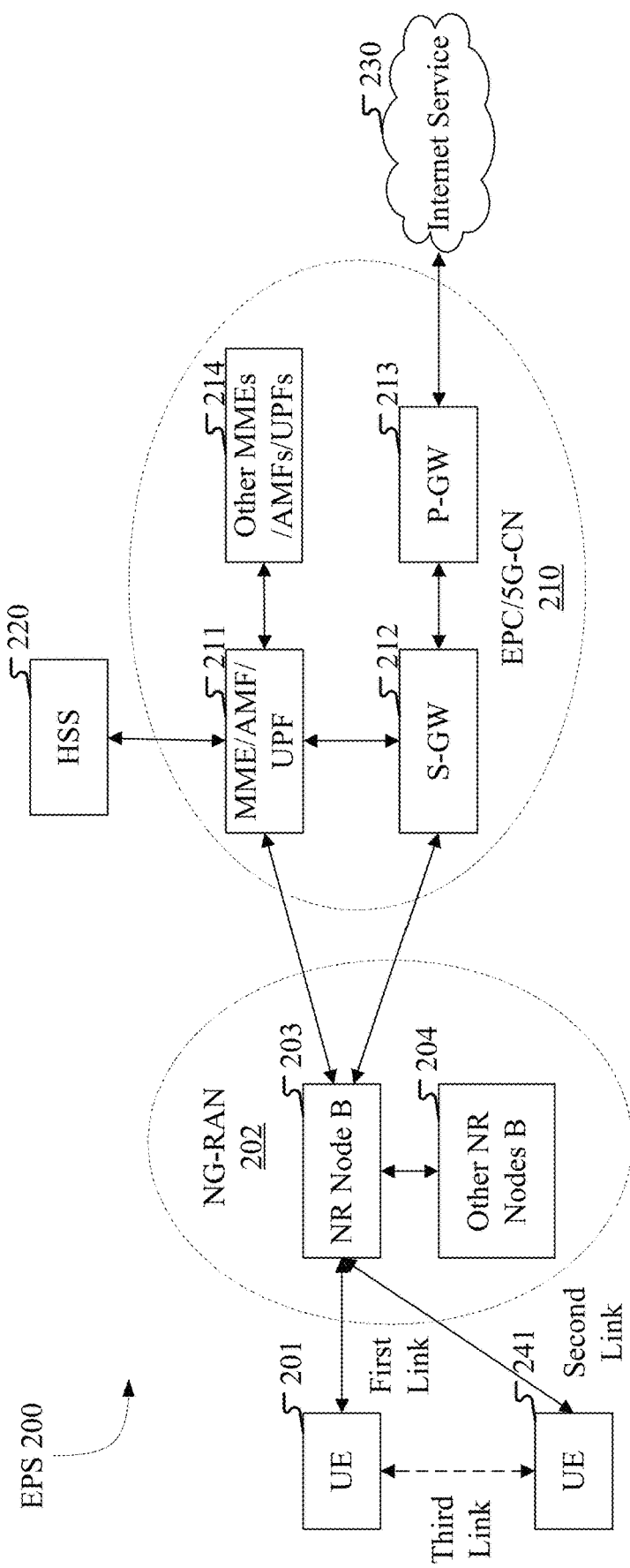
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a system network architecture 200 of NR 5G, Long-Term Evolution (LTE), and Long-Term Evolution Advanced (LTE-A). The NR 5G or LTE network architecture 200 may be called an Evolved Packet System (EPS) 200 or other appropriate terms. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the ESP may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services or other cellular networks. The NG-RAN includes an NR node B (gNB) 203 and other NR node B (gNBs) 204. The gNB 203 provides UE 201 oriented user plane and control plane protocol terminations. The gNB 203 may be connected to other gNB 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the EPC/5G-CN 210 via an S1/NG interface. The EPC/5G-CN 210 includes an MME/AMF/UPF 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet switching Streaming Services (PSSs).

In one embodiment, the UE 201 corresponds to the UE of the present disclosure.

In one embodiment, the gNB 203 corresponds to the base station of the present disclosure.

In one embodiment, the UE 201 supports adjustment of uplink transmission power.

In one embodiment, the gNB 203 supports control over uplink transmission power.

Embodiment 3

Figure 3:
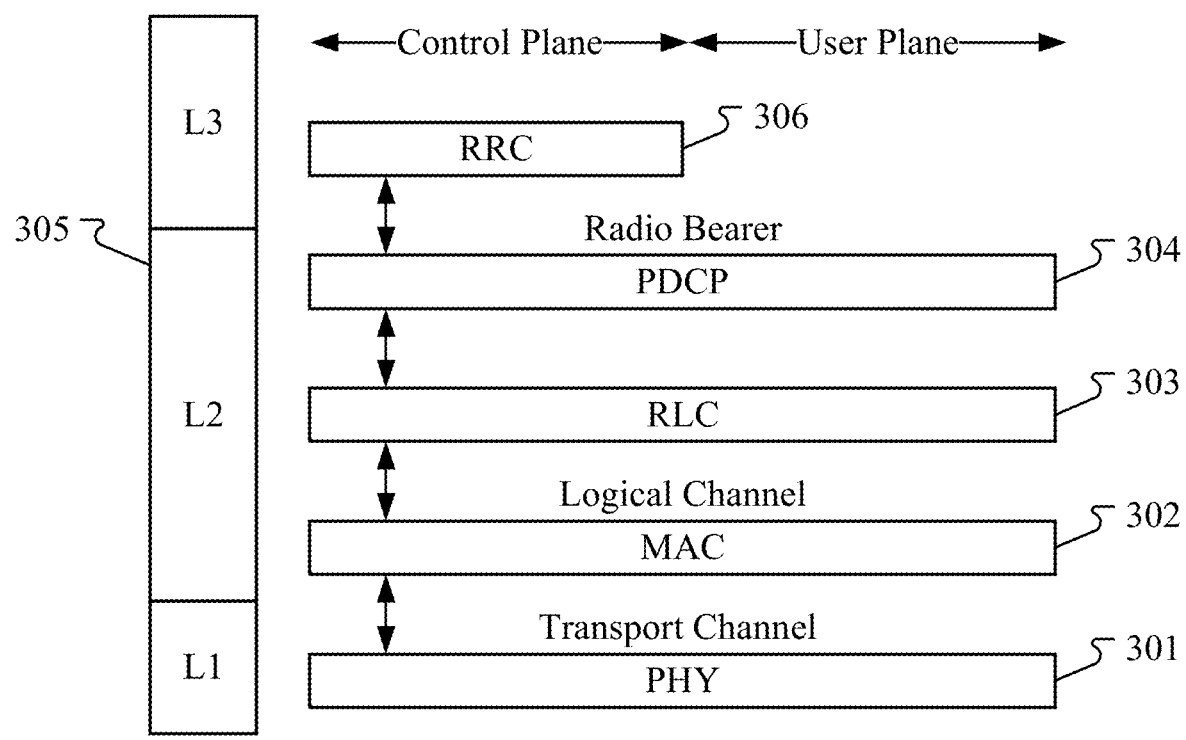
FIG. 3 illustrates a schematic diagram of a radio protocol architecture of a user plane and a control plane according to one embodiment of the present disclosure.

Embodiment 3 is a schematic diagram illustrating an embodiment of a radio protocol architecture of a user plane and a control plane according to the present disclosure, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this disclosure. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet so as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station device in the present disclosure.

In one subembodiment, the first signaling in the present disclosure is generated by the RRC 306.

In one subembodiment, the first signaling in the present disclosure is generated by the PHY 301.

In one subembodiment, the first wireless signal in the present disclosure is generated by the PHY 301.

In one subembodiment, the second signaling in the present disclosure is generated by the RRC 306.

In one subembodiment, the second signaling in the present disclosure is generated by the PHY 301.

In one subembodiment, the third signaling in the present disclosure is generated by the RRC 306.

In one subembodiment, the third signaling in the present disclosure is generated by the PHY 301.

Embodiment 4

Figure 4:
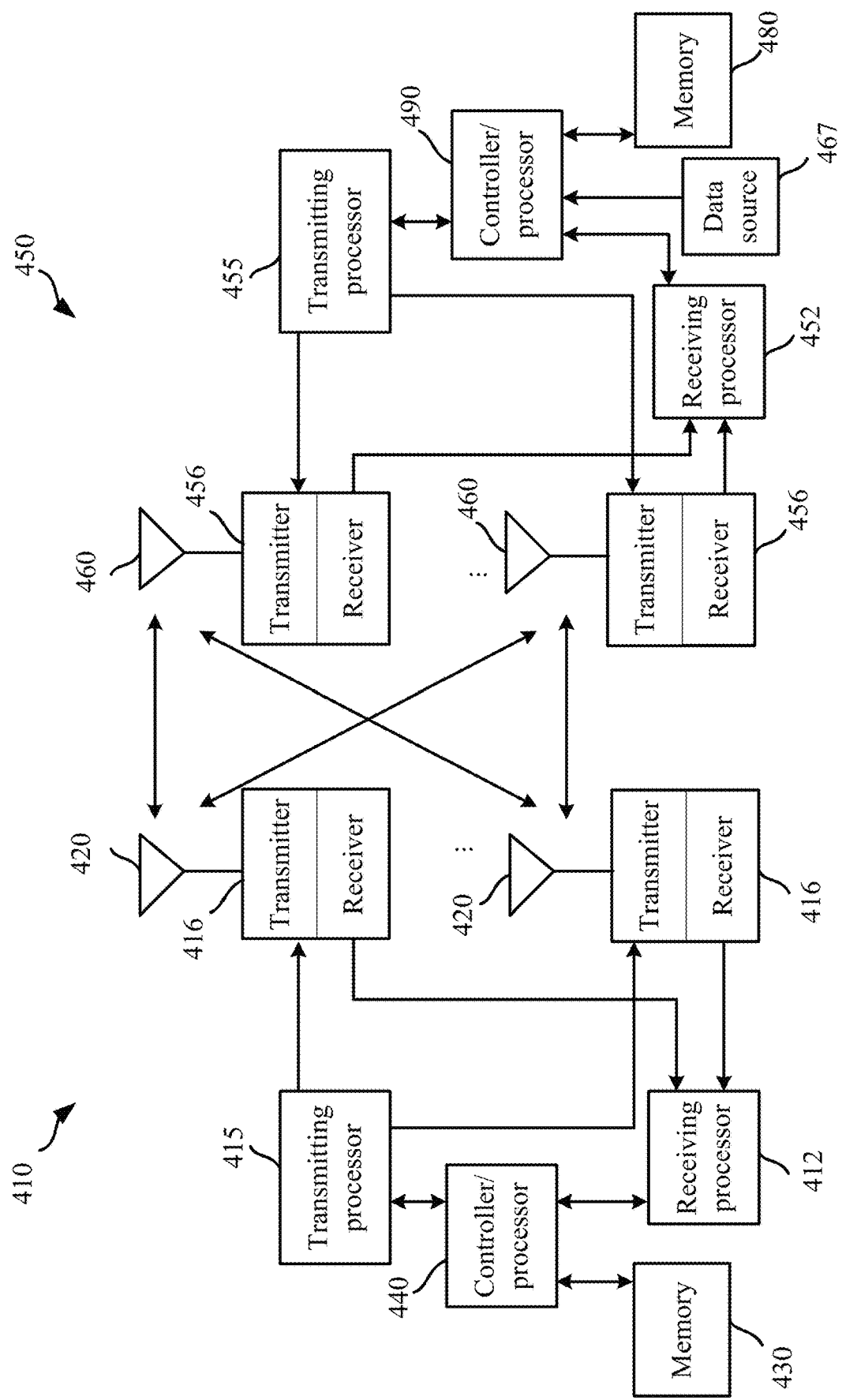
FIG. 4 illustrates a schematic diagram of a base station and a given user equipment according to one embodiment of the present disclosure.

Embodiment 4 illustrates a schematic diagram of a base station device and a given user equipment according to the present disclosure, as shown in FIG. 4. FIG. 4 is a block diagram of a gNB 410 in communication with a UE 450 in an access network.

The user equipment (UE 450) may comprise a controller/processor 490, a memory 480, a receiving processor 452, a transmitter/receiver 456, a transmitting processor 455 and a data source 467. The data source 467 provides packet header compression and decompression, encryption and decryption, packet segmentation and reordering, and multiplexing and demultiplexing between the logical and transport channels for implementing the L2 layer protocol for the user plane and the control plane. The upper-layer packets may include data or control information, such as a UL-SCH. The transmitting processor 455 implements various signal transmission processing functions for the L1 layer (i.e. the physical layer) including coding, interleaving, scrambling, modulating, power control/allocation, precoding and generation of physical layer control signaling. The target waveform generation and transmitting power (the first power) control of the first wireless signal of the present disclosure are implemented via the transmitting processor 455. The receiving processor 452 implements various signal reception processing functions for the L1 layer (i.e. the physical layer) including decoding, deinterleaving, descrambling, demodulating, deprecoding and extraction of physical layer control signaling. The transmitter 456 is configured to convert the baseband signals provided by the transmitting processor 455 into radio frequency signals and transmit the signals via the antenna 460, and the receiver 456 is configured to convert the radio frequency signals received through the antenna 460 into baseband signals and provide the signals to the receiving processor 452.

The base station equipment (410) may comprise a controller/processor 440, a memory 430, a receiving processor 412, a transmitter/receiver 416 and a transmitting processor 415. The upper-layer packets arrive at the controller/processor 440, which provides packet header compression and decompression, encryption and decryption, packet segmentation and reordering, and multiplexing and demultiplexing between the logical and transport channels for implementing the L2 layer protocol for the user plane and the control plane. The upper-layer packets may include data or control information, such as DL-SCH. The transmitting processor 415 implements various signal transmission processing functions for the L1 layer (i.e. the physical layer) including coding, interleaving, scrambling, modulating, power control/allocation, precoding and generation of physical layer control signaling (including a PBCH, PDCCH, a PHICH, a PCFICH, a reference signal), etc., a first signaling of the present disclosure can be generated by the transmitting processor 415 or a higher-layer signaling arrives at the controller/processor 440. The receiving processor 412 implements various signal reception processing functions for the L1 layer (i.e. the physical layer) including decoding, deinterleaving, descrambling, demodulating, deprecoding and extraction of physical layer control signaling, etc. The transmitter 416 is configured to convert the baseband signals provided by the transmitting processor 415 into radio frequency signals and transmit the signals via the antenna 420, the receiver 416 is configured to convert the radio frequency signals received via the antenna 420 into baseband signals and provide the signals to the receiving processor 412.

In uplink (UL) transmissions, a data source 467 is used to provide upper-layer packets to the controller/processor 490. The data source 467 represents all protocol layers above the L2 layer. The controller/processor 490 provides header compression, encryption, packet segmentation and reordering, and multiplexing between the logical and the transport channels through radio resources allocation based on gNB 410, for implementing the L2 layer protocol for the user plane and the control plane. The controller/processor 490 is also in charge of HARQ operation, retransmission of a lost packet, and a signaling to the gNB 410. A transmitting processor 455 performs various signal transmission processing functions used for the L1layer (i.e. the physical layer). The signal transmission processing functions include encoding and interleaving, so as to ensure an FEC and modulation of baseband signals corresponding to each modulation scheme (i.e., BPSK, QPSK) at the UE 350 side. The modulated signals are divided into parallel streams. Each of the parallel streams is mapped into multi-carrier subcarriers and/or multi-carrier symbols, then the multicarrier symbol streams are carried by a target waveform of the present disclosure, mapped by the transmitting processor 455 to the antenna 460 via the transmitter 456, and finally are transmitted as radio frequency signals with a first power of the present disclosure. The receiver 416 receives radio frequency wireless signals via a corresponding antenna 420, each receiver 416 recovers baseband information modulated to radio frequency carriers, and provides the baseband information to a receiving processor 412. The receiving processor 412 implements various signal reception processing functions for the L1 layer (i.e. the physical layer), which include multicarrier symbol streams carried by a target waveform of the present disclosure, demodulation of multicarrier symbols in multicarrier symbol streams corresponding to each modulation scheme (i.e., BPSK, QPSK), and decoding and deinterleaving so as to recover the original data and/or control signal transmitted by the UE 450 on a physical channel. The data and/or control signal will then be provided to a controller/processor 440. The controller/processor 440 performs functions of the L2 layer. The controller/processor can be connected to a memory 430 that stores program codes and data. The memory 430 may be a computer readable medium.

In one subembodiment, the UE 450 comprises at least one processor and at least one memory. The at least one memory comprises computer program codes; the at least one memory and the computer program codes are configured to be used in collaboration with the at least one processor. The UE 450 at least: receives a first signaling and transmits a first wireless signal; wherein a first modulation symbol sequence is used to generate the first wireless signal, the first modulation symbol sequence employs a target waveform, a first bit block is used to generate the first modulation symbol sequence, the first signaling is used to determine the target waveform out of X waveforms, the X is a positive integer greater than or equal to 2, a transmitting power of the first wireless signal is a first power, at least one of {an upper bound of the first power, the first power} is related to the target waveform.

In one subembodiment, the UE 450 comprises a memory that stores a computer readable instruction program. The computer readable instruction program generates an action when executed by at least one processor. The actions includes: receiving a first signaling and transmitting a first wireless signal; wherein a first modulation symbol sequence is used to generate the first wireless signal, the first modulation symbol sequence employs a target waveform, a first bit block is used to generate the first modulation symbol sequence, the first signaling is used to determine the target waveform out of X waveforms, the X is a positive integer greater than or equal to 2, a transmitting power of the first wireless signal is a first power, at least one of {an upper bound of the first power, the first power} is related to the target waveform.

In one subembodiment, the gNB 410 comprises at least one processor and at least one memory, the at least one memory comprises computer program codes; the at least one memory and the computer program codes are configured to be used in collaboration with the at least one processor. The gNB 410 at least: transmits a first signaling and receives a first wireless signal; wherein a first modulation symbol sequence is used to generate the first wireless signal, the first modulation symbol sequence employs a target waveform, a first bit block is used to generate the first modulation symbol sequence, the first signaling is used to determine the target waveform out of X waveforms, the X is a positive integer greater than or equal to 2, a transmitting power of the first wireless signal is a first power, at least one of {an upper bound of the first power, the first power} is related to the target waveform.

In one subembodiment, the gNB 410 comprises a memory that stores computer readable instruction program. The computer readable instruction program generates an action when executed by at least one processor. The action includes: transmitting a first signaling and receiving a first wireless signal; wherein a first modulation symbol sequence is used to generate the first wireless signal, the first modulation symbol sequence employs a target waveform, a first bit block is used to generate the first the first modulation symbol sequence, the first signaling is used to determine the target waveform out of X waveforms, the X is a positive integer greater than or equal to 2, a transmitting power of the first wireless signal is a first power, at least one of {an upper bound of the first power, the first power} is related to the target waveform.

In one subembodiment, the UE 450 corresponds to the UE in the present disclosure.

In one subembodiment, the gNB 410 corresponds to the base station in the present disclosure.

In one subembodiment, at least the former two of the receiver 456, the receiving processor 452 and the controller/processor 490 are used to receive the first signaling in the present disclosure.

In one subembodiment, the transmitter/receiver 456, the transmitting processor 455 and the data source 467 are used to transmit the first wireless signal in the present disclosure.

Embodiment 5

Figure 5:
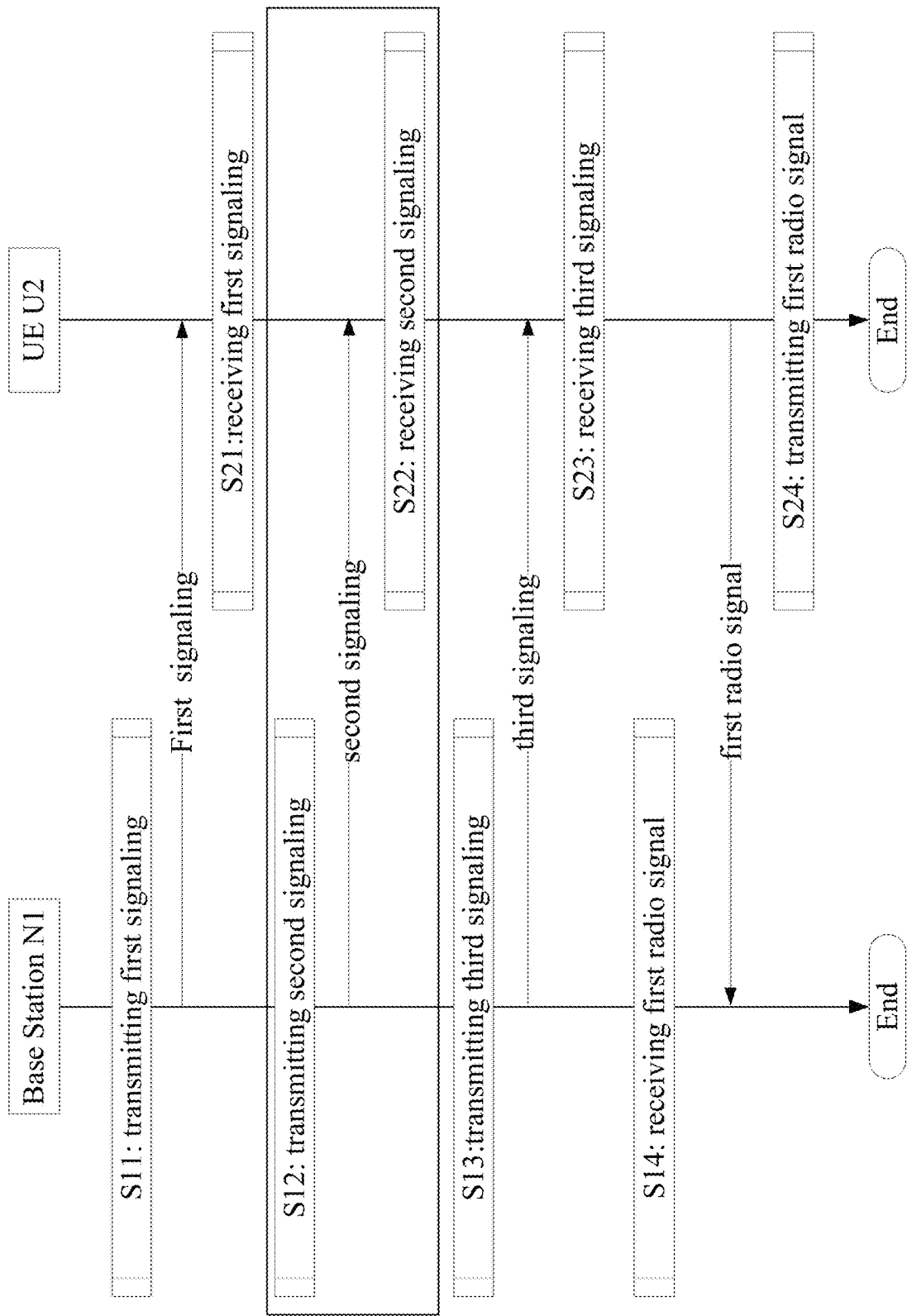
FIG. 5 illustrates a flow chart of wireless signal transmission according to one embodiment of the present disclosure.

Embodiment 5 illustrates a flow chart of wireless signal transmission, as shown in FIG. 5. In FIG. 5, the base station N1 is a maintenance base station for a serving cell of the UE U2. The steps identified in block F1 of the figure are optional.

The base station N1 transmits a first signaling in step S11, transmits a second signaling in step S12, transmits a third signaling in step S13, and receives a first wireless signal in step S14.

The UE U2 receives a first signaling in step S21, receives a second signaling in step S22, receives a third signaling in step S23, and transmits a first wireless signal in step S24.

In embodiment 5, a first modulation symbol sequence is used to generate the first wireless signal; the first modulation symbol sequence employs a target waveform; a first bit block is used to generate the first modulation symbol sequence; the first signaling is used to determine the target waveform out of X waveforms, the X is a positive integer greater than or equal to 2; a transmitting power of the first wireless signal is a first power; at last one of {an upper bound of the first power, the first power} is related to the target waveform. The second signaling is used to determine a first parameter; the first parameter is used to determine a lower bound of the upper bound of the first power, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one subembodiment, the first bit block comprises an output of a code block going through channel encoding. In one subembodiment, the code block is a Transport Block (TB). In one subembodiment, the code block is a part of a TB.

In one subembodiment, the first wireless signal is obtained after the first bit block sequentially goes through modulation mapper, layer mapper, precoding, resource element mapper and OFDM signal generation.

In one subembodiment, the first modulation symbol sequence is generated by modulating the first bit block, wherein the modulating is one of {Binary Phase Shift Keying (BPSK), π/2 BPSK, Quadrature Phase Shift Keying (QPSK), π/4 QPSK, 16 Quadrature Amplitude Modulation (16 QAM), 64 QAM, 256 QAM, 1024 QAM and 20156 QAM}.

In one subembodiment, the first signaling is a higher-layer signaling.

In one subembodiment, the first signaling is Radio Resource Control (RRC).

In one subembodiment, the first signaling is a physical layer signaling.

In one subembodiment, the second signaling is a higher-layer signaling.

In one subembodiment, the third signaling is a physical layer signaling.

In one subembodiment, the third signaling is a physical layer signaling, the third signaling comprises scheduling information of the first wireless signal, the scheduling information comprises at least one of {time-frequency resources occupied, MCS, RV, NDI, HARQ Process Identity Number (PID)}.

Embodiment 6

Figure 6:
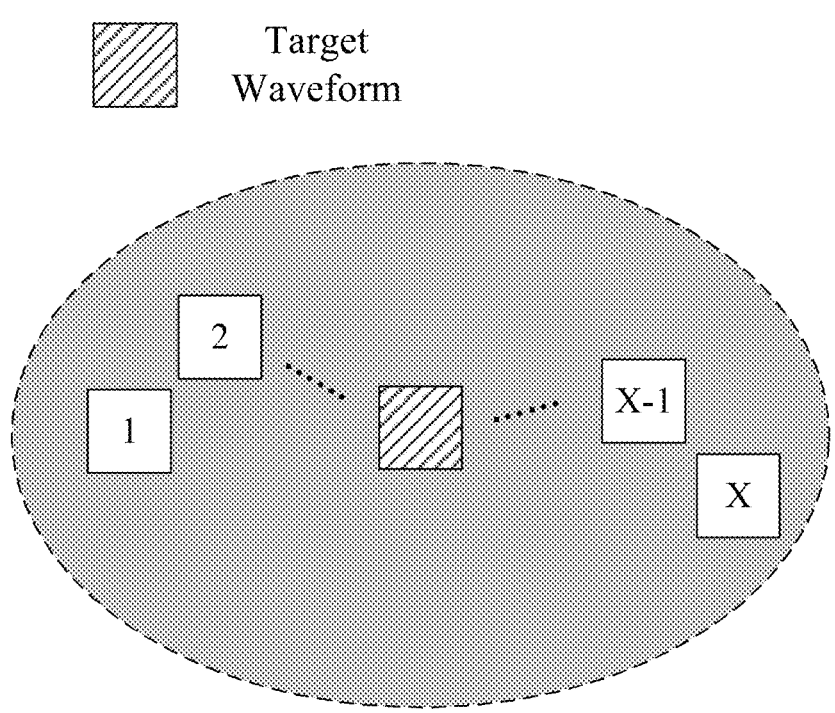
FIG. 6 illustrates a schematic diagram of the relationship between X waveforms and a target waveform according to one embodiment of the present disclosure.

Embodiment 6 illustrates a schematic diagram of the relationship between X waveforms and a target waveform, as shown in FIG. 6. In FIG. 6, each rectangle represents a waveform, wherein the rectangle filled by slashes represents a target waveform, and the ellipsis represents all possible waveforms. In Embodiment 6, the target waveform is one of the X waveforms, the X is an integer greater than or equal to 2.

In one subembodiment, the target waveform is based on OFDM, namely, the target waveform is generated by Inverse Discrete Fourier Transform (IDFI) or Inverse Fast Fourier Transform (IFFT) for the baseband.

In one subembodiment, the target waveform is Cyclic Prefix-Orthogonal Frequency Division Multiplexing (CP-OFDM).

In one subembodiment, the target waveform is Discrete Fourier Transform-Spread-Orthogonal Frequency Division Multiplexing (DFT-S-OFDM).

In one subembodiment, the target waveform is Single Carrier-Frequency Division Multiple Access (SC-FDMA).

In one subembodiment, the target waveform is Circularly Pulse Shaped-Orthogonal Frequency Division Multiplexing (CPS-OFDM).

In one subembodiment, the target waveform is Filter Bank-Orthogonal Frequency Division Multiplexing (FB-OFDM).

In one subembodiment, the target waveform is one of {Cyclic Prefix Less Precoded OFDM (CPLP-OFDM), Flexibly Configured OFDM (FC-OFDM), Flexible CP-OFDM (FCP-OFDM), Flexi-OFDM, Unique Word Discrete Fourier Transform spread Orthogonal Frequency Division Multiplexing (UW DFT-S-OFDM), Orthogonal Time Frequency Space (OTFS), Windowed OFDM (W-OFDM), and Filtered OFDM (F-OFDM)}.

In one subembodiment, the target waveform is generated by windowing on the basis of OFDM.

In one subembodiment, the target waveform is generated by filtering on the basis of OFDM.

In one subembodiment, the X waveforms are X of {CP-OFDM, DFT-S-OFDM, CPS-OFDM, FB-OFDM, CPLP-OFDM, FC-OFDM, FCP-OFDM, Flexi-OFDM, UW DFT-S-OFDM, OTFS, W-OFDM, F-OFDM}.

Embodiment 7

Figure 7:
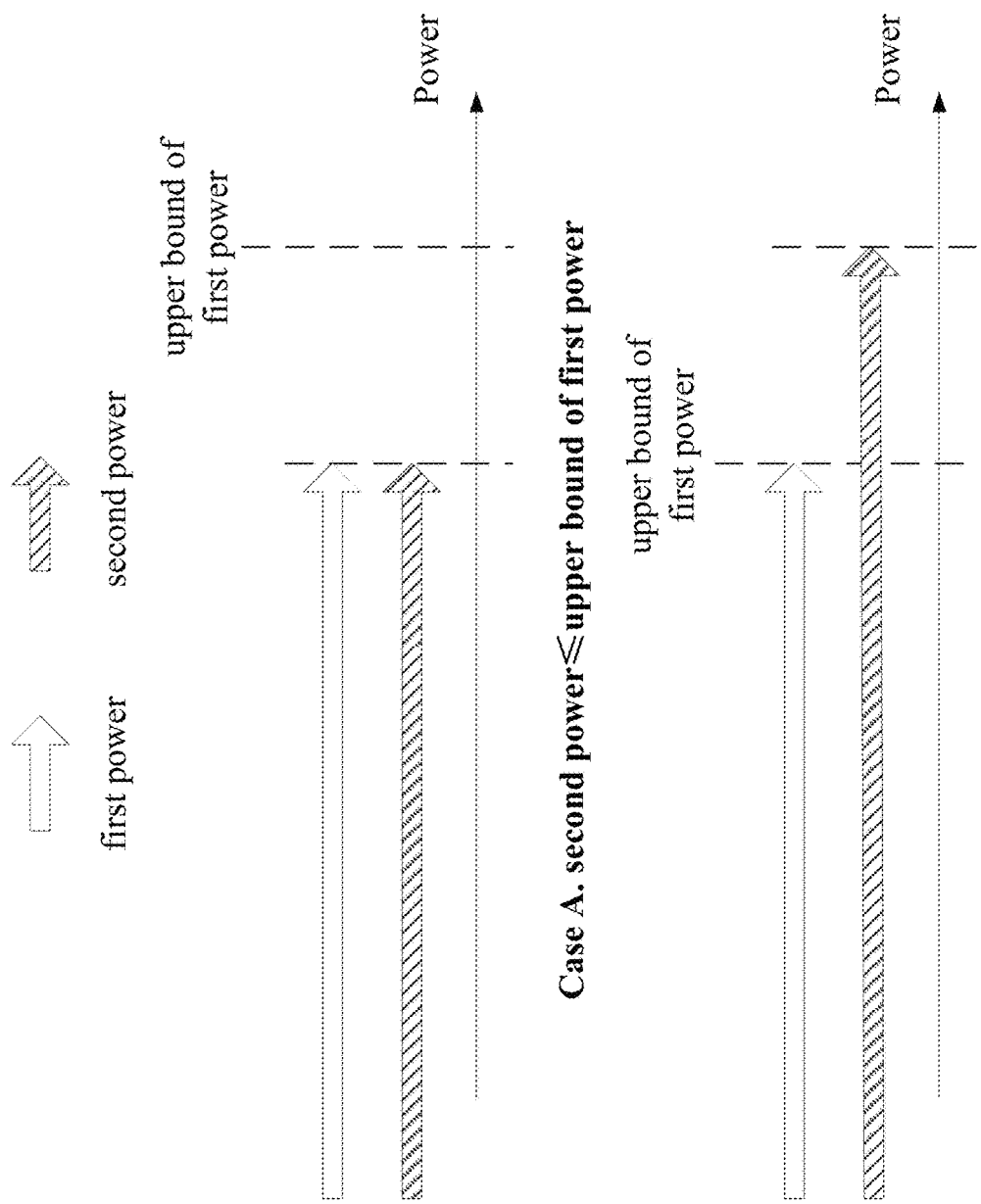
FIG. 7 illustrates a schematic diagram of the relationship between a first power and a second power according to one embodiment of the present disclosure.

Embodiment 7 illustrates a schematic diagram of the relationship between a first power and a second power, as shown in FIG. 7. In FIG. 7, there are two cases as follows: in Case A, a second power is less than or equal to an upper bound of a first power; in Case B, a second power is greater than or equal to an upper bound of a first power. The non-filling arrow represents a first power, and the arrow filled by slashes represents a second power. In Embodiment 7, the first power is equal to the smaller one of {the second power, an upper bound of the first power}, the second power is related to a target power.

In one subembodiment, the target waveform is used to determine a second parameter; the second parameter is linearly correlated with the second power.

In one subembodiment, the second power is described in the form of logarithm; the unit of the second parameter is dB. In one subembodiment, the unit of the second power is dBm.

In one subembodiment, the first power is a normalized transmitting power of the first wireless signal. The normalization refers to an average of the energies of all constellation points pertaining to one modulation scheme.

In one subembodiment, an upper bound of the first power is determined by the UE itself within a range of the upper bound of the first power.

In one subembodiment, the second power is greater than the upper bound of the first power.

In one subembodiment, the second power is less than the upper bound of the first power.

In one subembodiment, the second power is equal to the upper bound of the first power.

In one subembodiment, the second power is related to at least one of {a path loss of the UE, a target power of the UE, a type of carrier occupied by the first wireless signal, an amount of subcarriers occupied by first wireless signal, a subcarrier spacing of a subcarrier occupied by the first wireless signal, a modulation scheme of the first modulation symbol sequence}.

In one subembodiment, the second power is a normalized transmitting power, the normalization refers to an averaging of the energies of all constellation points pertaining to one modulation scheme.

In one subembodiment, the second power comprises a part controlled by open-loop power control and a part controlled by closed-loop power control.

Embodiment 8

Figure 8:
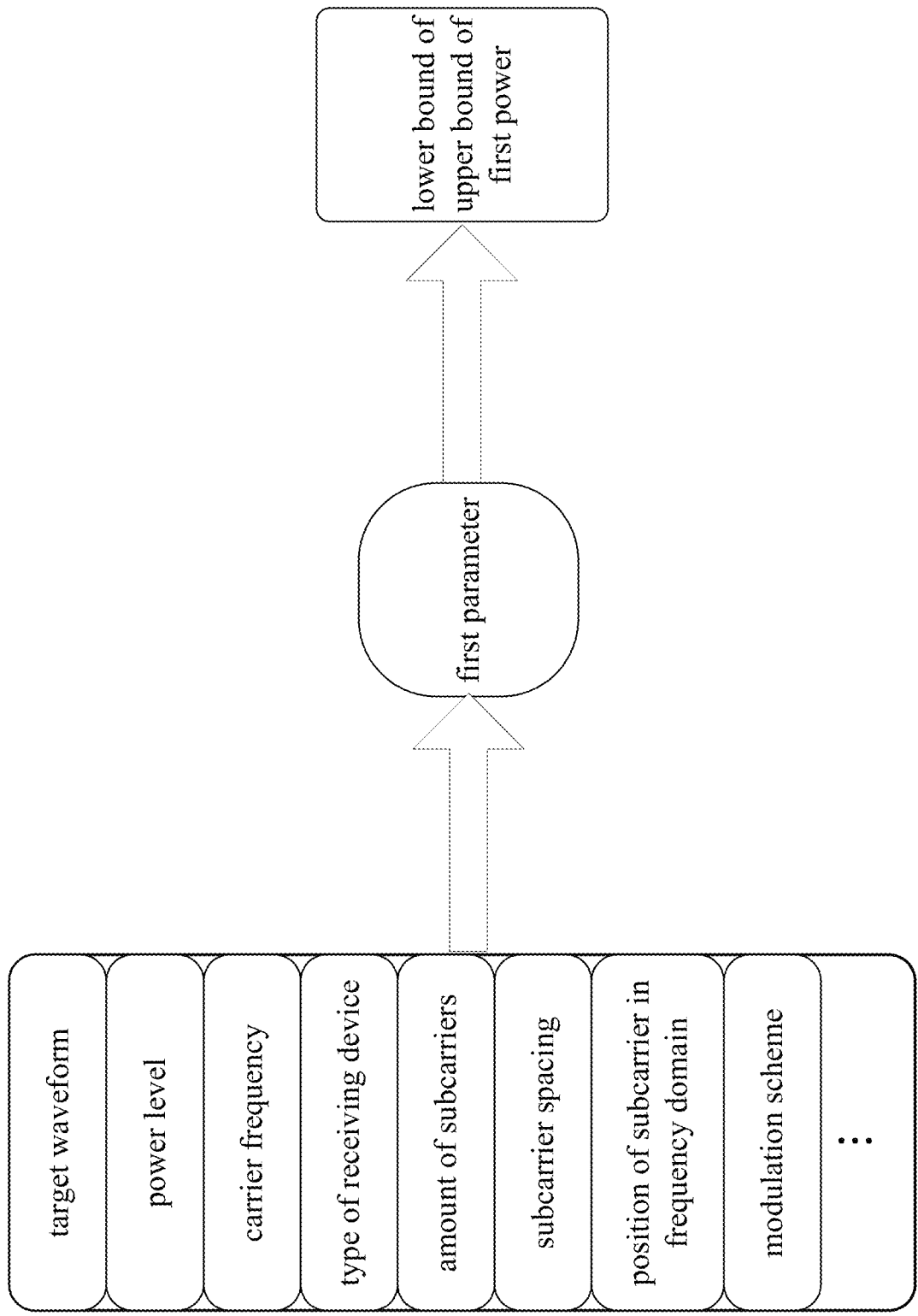
FIG. 8 illustrates a schematic diagram of the relationship between a lower bound of an upper bound of a first power and a target waveform according to one embodiment of the present disclosure.

Embodiment 8 illustrates a schematic diagram of the relationship between a lower bound of an upper bound of a first power and a target waveform, as shown in FIG. 8. In FIG. 8, each rectangle represents a parameter; the arrow represents a correlation between parameters. In Embodiment 8, a first parameter is used to determine a lower bound of the upper bound of the first power, the first parameter is also related to the target waveform, the first parameter is related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, a modulation scheme of the first wireless signal}.

In one subembodiment, the first parameter is Maximum Power Reduction (MPR).

In one subembodiment, the first parameter is Additional Maximum Power Reduction (A-MPR).

In one subembodiment, the first parameter is Power Management Maximum Power Reduction (P-MPR).

In one subembodiment, a lower bound of the upper bound of the first power is decided by the following formula:

$$P_{CMAX\_L,c} = \text{MIN}\{P_{A,c}, P_{PowerClass} - \text{MAX}(X\text{-}MPR_c, P\text{-}MPR_c)\}$$

Herein, carrier c denotes a serving carrier of the first wireless signal;

$P_{CMAX\_L,c}$ denotes the lower bound of the upper bound of the first power, the unit is dBm;

$P_{A,c}$ denotes a third parameter, the third parameter is configured by the network, the unit is dBm;

$P_{PowerClass}$ denotes a transmitting power corresponding to a power class of the UE, the unit is dBm;

X-$MPR_c$ denotes the first parameter, the unit is dB;

P-$MPR_c$ denotes P-MPR value, the unit is dB.

In one subembodiment, the first parameter is linearly correlated with the lower bound of the upper bound of the first power within a given range.

In one subembodiment, a transmitting power corresponding to the power class of the UE does not comprise a fluctuation range of tolerance.

In one subembodiment, the carrier frequency of the first wireless signal refers to a band for a system which the first wireless signal belongs to.

In one subembodiment, the type of receiving device of the first wireless signal is one of {base station device, user equipment, relay equipment}.

In one subembodiment, the subcarrier spacings of the subcarriers occupied by the first wireless signal are equal.

In one subembodiment, the position of the subcarriers occupied by the first wireless signal in frequency domain is within the edge Y MHz the system bandwidth of the access system in which the first wireless signal is transmitted; the Y is greater than 0. In one subembodiment, the Y is equal to 4.

In one subembodiment, the position of the subcarriers occupied by the first wireless signal in frequency domain is outside the edge Y MHz of the system bandwidth of the access system in which the first wireless signal is transmitted; the Y is greater than 0. In one subembodiment, the Y is equal to 4.

In one subembodiment, a modulation scheme of the first modulation symbol sequence is one of {Binary Phase Shift Keying (BPSK), π/2 BPSK, Quadrature Phase Shift Keying (QPSK), π/4 QPSK, 16 Quadrature Amplitude Modulation (16 QAM), 64 QAM, 256 QAM, 1024 QAM and 20156 QAM}.

Embodiment 9

Figure 9:
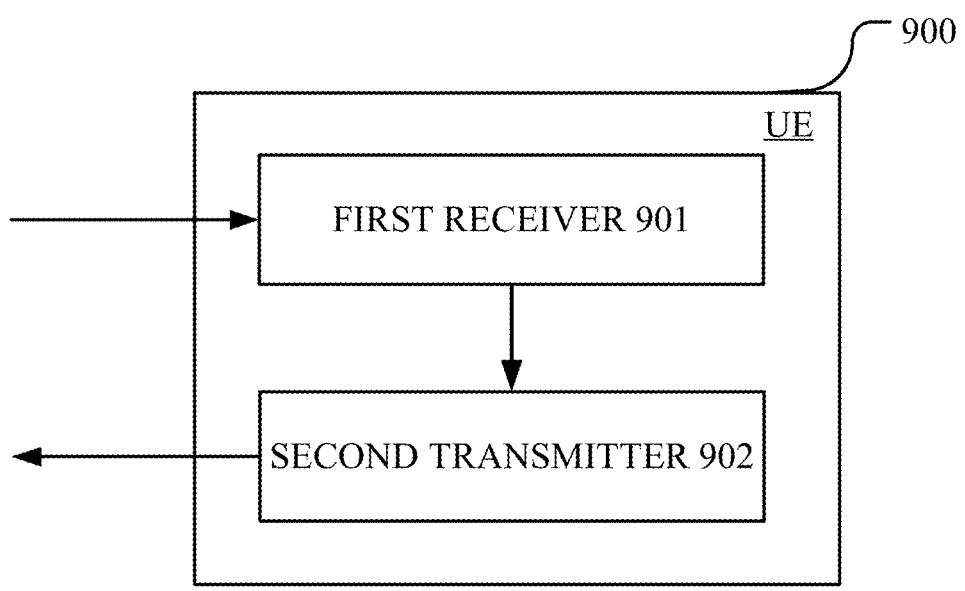
FIG. 9 illustrates a block diagram illustrating the structure of processing device for UE according to one embodiment of the present disclosure.

Embodiment 9 illustrates a block diagram illustrating the structure of processing device for UE, as shown in FIG. 9. In FIG. 9, a user equipment processing device 900 comprises a first receiver 901 and a second transmitter 902, the user equipment processing device 900 is a user equipment in FIG. 4 of the present disclosure, the first receiver 901 comprises a receiver 456 and a receiving processor 452 (or further a controller/processor 490) in FIG. 4, the second transmitter 902 comprises a transmitter 456 and a transmitting processor 455 in FIG. 4.

In Embodiment 9, a first receiver 901 receives a first signaling, a second transmitter 902 transmits a first wireless signal. A first modulation symbol sequence is used to generate the first wireless signal, the first modulation symbol sequence employs a target waveform, a first bit block is used to generate the first modulation symbol sequence, the first signaling is used to determine the target waveform out of X waveforms, the X is a positive integer greater than or equal to 2, a transmitting power of the first wireless signal is a first power, at least one of {an upper bound of the first power, the first power} is related to the target waveform.

In one subembodiment, the first receiver 901 further receives a second signaling, the second signaling is used to determine a first parameter, the first parameter is used to determine a lower bound of the upper bound of the first power, the first parameter is related to the target waveform.

In one subembodiment, the first parameter is also related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one subembodiment, the X is equal to 2; the X waveforms are OFDM and SC-FDMA respectively.

In one subembodiment, the first receiver 901 further receives a third signaling, the third signaling is used to determine at least one of {an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one subembodiment, the first power is equal to the smaller one of {a second power, the upper bound of the first power}; the second power is related to the target waveform.

In one subembodiment, the target waveform is used to determine a second parameter; the second parameter is linearly correlated with the second power.

Embodiment 10

Figure 10:
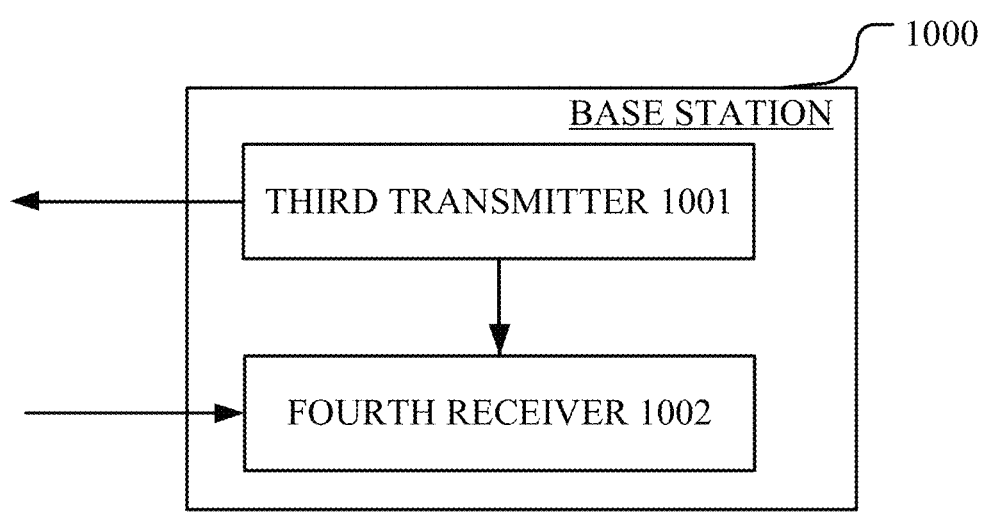
FIG. 10 illustrates a block diagram illustrating the structure of processing device for base station according to one embodiment of the present disclosure.

Embodiment 10 illustrates a block diagram illustrating the structure of processing device for base station, as shown in FIG. 10. In FIG. 10, a base station processing device 1000 comprises a third transmitter 1001 and a fourth receiver 1002, the base station processing device is a base station in FIG. 4 of the present disclosure, a third transmitter 1001 comprises a transmitter 416 and a transmitting processor 415 (or further a controller/processor 440) in FIG. 4, a fourth receiver 1002 comprises a receiver 416 and a receiving processor 412 in FIG. 4.

In Embodiment 10, a third transmitter 1001 transmits a first signaling, a fourth receiver 1002 receives a first wireless signal. A first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; at least one of {an upper bound of the first power, the first power} is related to the target waveform.

In one subembodiment, the third transmitter 1001 further transmits a second signaling; the second signaling is used to determine a first parameter; the first parameter is used to determine a lower bound of the upper bound of the first power; the first parameter is related to the target waveform.

In one subembodiment, the first parameter is also related to at least one of {a power class of the UE, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one subembodiment, the X is equal to 2; the X waveforms are OFDM and SC-FDMA respectively.

In one subembodiment, the third transmitter 1001 further transmits a third signaling; the third signaling is used to determine at least one of {an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence}.

In one subembodiment, the first power is equal to the smaller one of {a second power, the upper bound of the first power}; the second power is related to the target waveform.

In one subembodiment, the target waveform is used to determine a second parameter; the second parameter is linearly correlated with the second power.

The ordinary skill in the art may understand that all or part of steps in the above method may be implemented by instructing related hardware through a program. The program may be stored in a computer readable storage medium, for example Read-Only Memory (ROM), hard disk or compact disk, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to mobile phones, tablet computers, notebooks, network cards, low power equipment, Machine Type Communication (MTC) equipment, NB-IoT equipment, vehicle-mounted communication equipment and other wireless communication equipment. The base station or network side equipment in the present disclosure includes but is not limited to macro-cellular base stations, micro-cellular base stations, home base stations, relay base station and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for supporting power adjustment, comprising:
   receiving a first signaling; and
   transmitting a first radio signal;
   wherein, a first modulation symbol sequence is used to generate the first radio signal, the first modulation symbol sequence employs a target waveform, a first bit block is used to generate the first modulation symbol sequence, the first signaling is used to determine the target waveform out of X waveforms, the X is a positive integer greater than or equal to 2, a transmitting power of the first radio signal is a first power, the target waveform is used to determine an upper bound of the first power, the first power is equal to the smaller one of a second power and the upper bound of the first power, the second power is related to a pathloss of the UE.

2. The method according to claim 1, wherein the upper bound of the first power is set by the user equipment (UE) itself within a range of the upper bound of the first power; the X is equal to 2, the X waveforms are CP-OFDM and DFT-s-OFDM respectively.

3. The method according to claim 1, comprising:
receiving a second signaling;
wherein the second signaling is used to determine a first parameter; the first parameter is used to determine a lower bound of the upper bound of the first power; the first parameter is related to the target waveform; the first parameter is MPR, or the first parameter is A-MPR.

4. The method according to claim 3, wherein the first parameter is further related to at least one of a power class of the user equipment; a frequency of a carrier where the first wireless signal is carried; a type of a receiver of the first wireless signal; an amount of subcarriers occupied by the first wireless signal; a subcarrier spacing of a subcarrier occupied by the first wireless signal; a position of subcarriers occupied by the first wireless signal in frequency domain and a modulation scheme of the first modulation symbol sequence.

5. The method according to claim 1, comprising:
receiving a third signaling;
wherein the third signaling is used to determine at least one of an amount of subcarriers occupied by the first wireless signal; a subcarrier spacing of a subcarrier occupied by the first wireless signal; a position of subcarriers occupied by the first wireless signal in frequency domain and a modulation scheme of the first modulation symbol sequence.

6. A method in a Base Station for supporting power adjustment, comprising:
transmitting a first signaling; and
receiving a first wireless signal;
wherein a first modulation symbol sequence is used to generate the first wireless signal;
the first modulation symbol sequence employs a target waveform; a first bit block is used to generate the first modulation symbol sequence;; the first signaling is used to determine the target waveform out of X waveforms; the X is a positive integer greater than or equal to 2; a transmitting power of the first wireless signal is a first power; the target waveform is used to determine an upper bound of the first power, the first power is equal to the smaller one of a second power and the upper bound of the first power, the second power is related to a pathloss of a UE.

7. The method according to claim 6, wherein the upper bound of the first power is self-set by a transmitter of the first wireless signal within a range of the upper bound of the first power;
the X is equal to 2, the X waveforms are CP-OFDM and DFT-s-OFDM respectively.

8. The method according to claim 6, comprising:
transmitting a second signaling;
wherein the second signaling is used to determine a first parameter; the first parameter is used to determine a lower bound of the upper bound of the first power; the first parameter is related to the target waveform; the first parameter is MPR, or the first parameter is A-MPR.

9. The method according to claim 8, wherein the first parameter is further related to at least one of a power class of a transmitter of the first wireless signal, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence.

10. The method according to claim 6, comprising:
transmitting a third signaling;
wherein the third signaling is used to determine at least one of an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence.

11. A user equipment supporting power adjustment, comprising:
a first receiver, receiving a first signaling; and
a second transmitter, transmitting a first wireless signal;
wherein a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; an upper bound of the first power is related to the target waveform is used to determine an upper bound of the first power, the first power is equal to the smaller one of a second power and the upper bound of the first power, the second power is related to a pathloss of the UE.

12. The user equipment according to claim 11, wherein the upper bound of the first power is set by the user equipment itself within a range of the upper bound of the first power;
the X is equal to 2; the X waveforms are CP-OFDM and DFT-s-OFDM respectively.

13. The user equipment according to claim 11, wherein the first receiver also receives a second signaling; the second signaling is used to determine a first parameter; the first parameter is used to determine a lower bound of the upper bound of the first power; the first parameter is related to the target waveform; the first parameter is MPR, or the first parameter is A-MPR.

14. The user equipment according to claim 13, wherein the first parameter is further related to at least one of a power class of the user equipment, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence.

15. The user equipment according to claim 11, wherein the first receiver also receives a third signaling; wherein the third signaling is used to determine at least one of an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence.

16. A base station supporting power adjustment, comprising:
- a third transmitter, transmitting a first signaling; and
- a fourth receiver, receiving a first wireless signal;
- wherein a first modulation symbol sequence is used to generate the first wireless signal; the first modulation symbol sequence employs a target waveform; a first bit block is used to generate the first modulation symbol sequence; the first signaling is used to determine the target waveform out of X waveforms; the X is a positive integer greater than or equal to 2; a transmitting power of the first wireless signal is a first power; an upper bound of the first power is related to the target waveform is used to determine an upper bound of the first power, the first power is equal to the smaller one of a second power and the upper bound of the first power, the second power is related to a pathloss of a UE.

17. The base station according to claim 16, wherein an upper bound of the first power is self-set by a transmitter of the first wireless signal within a range of the upper bound of the first power;
- the X is equal to 2, the X waveforms are CP-OFDM and DFT-s-OFDM respectively.

18. The base station according to claim 16, wherein the third transmitter also transmits a second signaling; the second signaling is used to determine a first parameter; the first parameter is used to determine a lower bound of the upper bound of the first power; the first parameter is related to the target waveform; the first parameter is MPR, or the first parameter is A-MPR.

19. The base station according to claim 18, wherein the first parameter is further related to at least one of a power class of a transmitter of the first wireless signal, a frequency of a carrier where the first wireless signal is carried, a type of a receiver of the first wireless signal, an amount of subcarriers occupied by the first wireless signal, a subcarrier spacing of a subcarrier occupied by the first wireless signal, a position of subcarriers occupied by the first wireless signal in frequency domain and a modulation scheme of the first modulation symbol sequence.

20. The base station according to claim 16, the third transmitter also transmits a third signaling; wherein the third signaling is used to determine at least one of an amount of subcarriers occupied by the first wireless signal, a subcarrier spacing of a subcarrier occupied by the first wireless signal, a position of subcarriers occupied by the first wireless signal in frequency domain, and a modulation scheme of the first modulation symbol sequence.

* * * * *